US011625310B2

(12) United States Patent
Gonen (10) Patent No.: US 11,625,310 B2
(45) Date of Patent: *Apr. 11, 2023

(54) APPLICATION REGRESSION DETECTION IN COMPUTING SYSTEMS

(71) Applicant: Microsoft Technology Licensing, LLC, Redmond, WA (US)

(72) Inventor: Eran Gonen, Hod Hasharon (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/335,306

(22) Filed: Jun. 1, 2021

(65) Prior Publication Data
US 2021/0286698 A1 Sep. 16, 2021

Related U.S. Application Data

(63) Continuation of application No. 16/673,674, filed on Nov. 4, 2019, now Pat. No. 11,048,607, which is a continuation of application No. 15/726,709, filed on Oct. 6, 2017, now Pat. No. 10,503,625.

(51) Int. Cl.
*G06F 11/34* (2006.01)
*G06F 11/07* (2006.01)
*G06F 11/36* (2006.01)

(52) U.S. Cl.
CPC ...... *G06F 11/3433* (2013.01); *G06F 11/0793* (2013.01); *G06F 11/3428* (2013.01); *G06F 11/3452* (2013.01); *G06F 11/3495* (2013.01); *G06F 11/3608* (2013.01)

(58) Field of Classification Search
CPC ............ G06F 11/3433; G06F 11/0793; G06F 11/3428; G06F 11/3452; G06F 11/3495; G06F 11/3608
See application file for complete search history.

(56) References Cited

U.S. PATENT DOCUMENTS 5,675,711 A * 10/1997 Kephart ................ G06F 21/564
706/20
7,574,686 B1 * 8/2009 Wadland ............... G06F 30/394
716/126

(Continued)

*Primary Examiner* — Kamini B Patel
(74) *Attorney, Agent, or Firm* — Newport IP, LLC; Jacob P. Rohwer (57) ABSTRACT

Computing systems, devices, and associated methods of detecting application regression in a distributed computing system are disclosed herein. In one embodiment, a method includes receiving data representing telemetry records from one or more hosts of the distributed computing system. At least some of the telemetry records are exception records individually indicating an operation by a user application has failed during execution. The method also includes determining a failure rate of executing the operation by the user application while compensating for a workload of the user application in the distributed computing system. A comparison is performed between the determined failure rate and a threshold. Based on the performed comparison, a regression notification can be generated to indicate that application regression has occurred notwithstanding the workload of the user application in the distributed computing system.

20 Claims, 6 Drawing Sheets

(56) References Cited

U.S. PATENT DOCUMENTS

| | | | |
|---|---|---|---|
| 7,757,124 B1* | 7/2010 | Singh | G06F 11/26 |
| | | | 714/45 |
| 10,503,625 B2* | 12/2019 | Gonen | G06F 11/3608 |
| 11,048,607 B2* | 6/2021 | Gonen | G06F 11/3428 |
| 2002/0091991 A1* | 7/2002 | Castro | G06F 9/06 |
| | | | 717/106 |
| 2006/0129992 A1* | 6/2006 | Oberholtzer | G06F 11/3428 |
| | | | 717/124 |
| 2007/0010975 A1* | 1/2007 | Fine | G06F 30/3323 |
| | | | 703/2 |
| 2009/0106521 A1* | 4/2009 | Whisnant | H03M 7/30 |
| | | | 711/170 |
| 2010/0198809 A1* | 8/2010 | Graefe | G06F 16/24549 |
| | | | 707/E17.005 |
| 2012/0254414 A1* | 10/2012 | Scarpelli | G06F 11/3495 |
| | | | 709/224 |
| 2014/0013307 A1* | 1/2014 | Hansson | G06F 11/3688 |
| | | | 717/124 |
| 2014/0325480 A1* | 10/2014 | Bhagavatula | G06F 11/3688 |
| | | | 717/124 |
| 2015/0058681 A1* | 2/2015 | Lingannapeta | G06F 11/3068 |
| | | | 714/47.3 |
| 2015/0294331 A1* | 10/2015 | Riddell | G06Q 30/0202 |
| | | | 705/7.31 |
| 2017/0235663 A1* | 8/2017 | Kattepur | G06F 11/3433 |
| | | | 717/131 |
| 2018/0095155 A1* | 4/2018 | Soni | G01S 19/015 |
| 2019/0025376 A1* | 1/2019 | Saha | G01R 31/374 |
| 2019/0108115 A1* | 4/2019 | Gonen | G06F 11/3428 |
| 2020/0065211 A1* | 2/2020 | Gonen | G06F 11/3495 |
| 2021/0286698 A1* | 9/2021 | Gonen | G06F 11/0793 |

\* cited by examiner

APPLICATION REGRESSION DETECTION IN COMPUTING SYSTEMS

CROSS-REFERENCE TO RELATED APPLICATION(S)

This application is a continuation of and claims priority to U.S. patent application Ser. No. 16/673,674, filed on Nov. 4, 2019, which is a continuation of and claims priority to U.S. patent application Ser. No. 15/726,709, filed on Oct. 6, 2017, now U.S. Pat. No. 10,503,625, issued on Dec. 10, 2019.

BACKGROUND

Distributed computing systems typically include routers, switches, bridges, and other physical network devices that interconnect a large number of servers, network storage devices, and other types of computing devices. The individual servers can host one or more virtual machines ("VMs"), virtual switches, or other types of virtualized functions. The virtual machines can facilitate execution of suitable user applications to provide desired cloud services or other suitable types of computing service to tenants of the distributed computing systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

When user applications are executed by remote servers in a datacenter or a distributed computing system, the user applications may encounter various execution difficulties. For example, user applications may experience memory faults, communication time-outs, invalid operation calls, unexpected data errors, or other execution exceptions. In another example, user applications may experience request exceptions, for instance, failure to perform a Hypertext Transfer Protocol ("HTTP") load operation for an index or other types of webpage identified by a Uniform Resource Locator ("URL"). In yet further examples, user applications can experience dependency exceptions such as failures of query calls to backend databases.

In certain implementations, user applications and/or other components of the distributed computing system can be configured to provide "error telemetry" by detecting and emitting execution status, results, or errors as various types of telemetry records. The emitted telemetry records can then be analyzed to identify potential programming or configuration issues. For example, application regression analysis can be performed to verify that a user applications is correctly developed or configured to perform designed functions. As such, performing application regression analysis can uncover software bugs or "regressions" of a user application. In certain implementations, application regression analysis can be performed when the user application is initially deployed in a distributed computing system. In other implementations, the application regression analysis can be performed after the user application is changed and/or interfaced with other software components (e.g., software services) in the distributed computing system. Example changes to the user application can include software enhancements/updates, software patches, configuration changes, and/or other suitable modifications.

Though application regression analysis can be used to uncover regression of a user application, proactively detecting application regression of a life site based on error telemetry can be difficult. An increase in a number of emitted exception records may indicate an incompatibility or errors in the user application, but may also indicate an increase in utilization or workload of the user application. For example, the number of exception records can increase when an applied change causes the user application to be incompatible with other software services or components. In another example, the number of telemetry records can also increase when the user application is experiencing high workloads. In further examples, both the foregoing conditions can result in an increase in the number of telemetry records indicating operation failures. Distinguishing between the possible causes can be difficult because a workload of a user application can be difficult to measure.

Several embodiments of the disclosed technology can provide reliable and proactive detection of user application regression by deducing a workload of a user application and compensating for an increase in the workload when analyzing telemetry records indicating exceptions. In certain embodiments, a score function can be defined based on the telemetry records emitted from the user application in a timespan or timeframe. In one example, a score function can include a rule-based function configured to calculate an error percentage (or a failure rate) by dividing a number of sessions (or occurrences) for each of multiple operations having telemetry records indicating exceptions by a total number of sessions in which the operation has been executed. For instance, the logical operation can include performing an HTTP load of a webpage identified by a URL. The score function can be configured to calculate an error percentage by dividing a number of sessions having request exceptions when performing the HTTP load over a total number of sessions in which the HTTP load is attempted.

In another example, when multiple sessions can be identified for a single operation, the score function can be configured to calculate an error percentage by dividing a number of sessions having telemetry records indicating exceptions divided by a total number of sessions. For instance, the single operation may include a worker process that is created periodically for performing background processing such as virus scanning, document indexing, or other suitable maintenance operations. In a further example, when no session identifications are known from the received telemetry records, a score function can be configured to calculate an error percentage by dividing a number of telemetry records indicating exceptions by a total number of all other telemetry records. Such an implementation may be applied to a continuously running worker component for performing background processing.

In other embodiments, the exception records can also be normalized by using other load-related indicators. For example, the exception records can be normalized based on a processor load, a network throughput, a number of user requests, or other suitable load-related indicators associated with a host executing a user application. In further embodiments, machine learning may be applied to determine a baseline for the telemetry records indicating exceptions and/or error percentages.

Several embodiments of the disclosed technology can proactively detect application regression based on the score function described above. In certain embodiments, a process for detecting application regression can include defining a binned timespan to analyze telemetry records indicating exceptions for a user application. For example, the timespan can be one week that is binned for single days of the week. The process can then include calculating, for each bin, an error percentage using the score function described above based on the telemetry records indicating exceptions. As such, the telemetry records indicating exceptions of the user application can be normalized based on a workload of the user application.

The process can then include detecting degradation or regression in the user application by detecting an increase, spike, plateau, or other suitable types of patterns in the calculated error percentages. For example, when the error percentages consistently increase from day to day during the week over a threshold, regression of the user application can be detected. Then, the user application and/or any change(s) applied thereto can then be further analyzed, debugged, or otherwise corrected.

DETAILED DESCRIPTION

Certain embodiments of systems, devices, components, modules, routines, data structures, and processes for proactively detecting application regression in datacenters or other suitable distributed computing systems are described below. Even though the disclosed technology is described below in the context of a distributed computing system, certain embodiments of the disclosed technology can also be applied for proactively detecting application regression in mobile applications (e.g., smartphone apps), desktop applications (e.g., word processors, etc.), or other suitable applications capable of emitting telemetry records regarding execution of operations by the applications. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-7.

As used herein, the term "distributed computing system" generally refers to an interconnected computer network having a plurality of network nodes that connect a plurality of servers or hosts to one another or to external networks (e.g., the Internet). The term "network node" generally refers to a physical network device. Example network nodes include routers, switches, hubs, bridges, load balancers, security gateways, or firewalls. A "host" generally refers to a physical computing device configured to implement, for instance, one or more virtual machines, virtual switches, or other suitable virtualized components. For example, a host can include a server having a hypervisor configured to support one or more virtual machines, virtual switches or other suitable types of virtual components.

A computer network can be conceptually divided into an overlay network implemented over an underlay network. An "overlay network" generally refers to an abstracted network implemented over and operating on top of an underlay network. The underlay network can include multiple physical network nodes interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can host one or more tenant end points ("TEPs"), for example, virtual machines configured to execute one or more user applications. The virtual networks can interconnect multiple TEPs on different hosts. Virtual network nodes in the overlay network can be connected to one another by virtual links individually corresponding to one or more network routes along one or more physical network nodes in the underlay network.

Further used herein, the term "telemetry record" generally refers to electronic messages or other type of data received from automated communications processes by which measurements, operating status, execution results, and/or other data are collected remotely and transmitted to a receiving computing device. For example, a telemetry record can include an electronic message received from an application, a VM, or a host in a distributed computing device. The telemetry record can contain data indicating whether an operation (e.g., loading of a webpage, querying a backend database, etc.) was attempted, successful, or failed. The telemetry record can also include time stamps, source identifications (e.g., a host ID), and other suitable information. As used herein, telemetry records containing data that report or indicate a failed operation are referred to as "exception records."

Also used herein, the term "session" generally refers to an interactive information interchange between two or more communicating computing devices, or between a computing device and a user. In one example, a session can include execution of an instance of a user application to provide a corresponding cloud service to a user. For instance, the user application can include a word processor application execution of which provides a web accessible word processing service for a user to interact with. In other examples, a session can include execution of a spreadsheet application, an email client, or other suitable types of application to provide corresponding cloud services.

Further used herein, the term "application regression" generally refers to a condition under which a user application encounters exceptions or errors during execution. Such exceptions can be a result of software development, configuration, update, patches, and/or other issues related to the user application. For example, after a software update or patch is applied to a user application, coding or configuration errors in the applied software update or patch may cause execution errors in the user application.

Though application regression analysis can be used to uncover such errors in the user application and/or software updates/patches, proactively detecting application regression of a life site can be difficult. An increase in a number of emitted exception records may indicate a regression incompatibility in the user application, but may also indicate an increase in utilization or workload of the user application. Thus, distinguishing between the possible causes can be difficult to achieve because a workload of the user application may be unknown.

Several embodiments of the disclosed technology can proactively detect application regression by deducing a workload of a user application and compensating for an increase in the workload when analyzing exception records. In certain embodiments, a score function can be defined to normalize the telemetry records with a deduced workload. For example, the telemetry records can be normalized by dividing a number of sessions (or occurrences) for each of multiple operations having exceptions by a total number of sessions in which the operation has been executed. Thus, by taking into account the total number of sessions, a workload of the user application can be deduced and compensated for when deriving the error percentages. As such, application regression may be detected proactively, as described in more detail below with reference to FIGS. 1-7.

Figure 1:
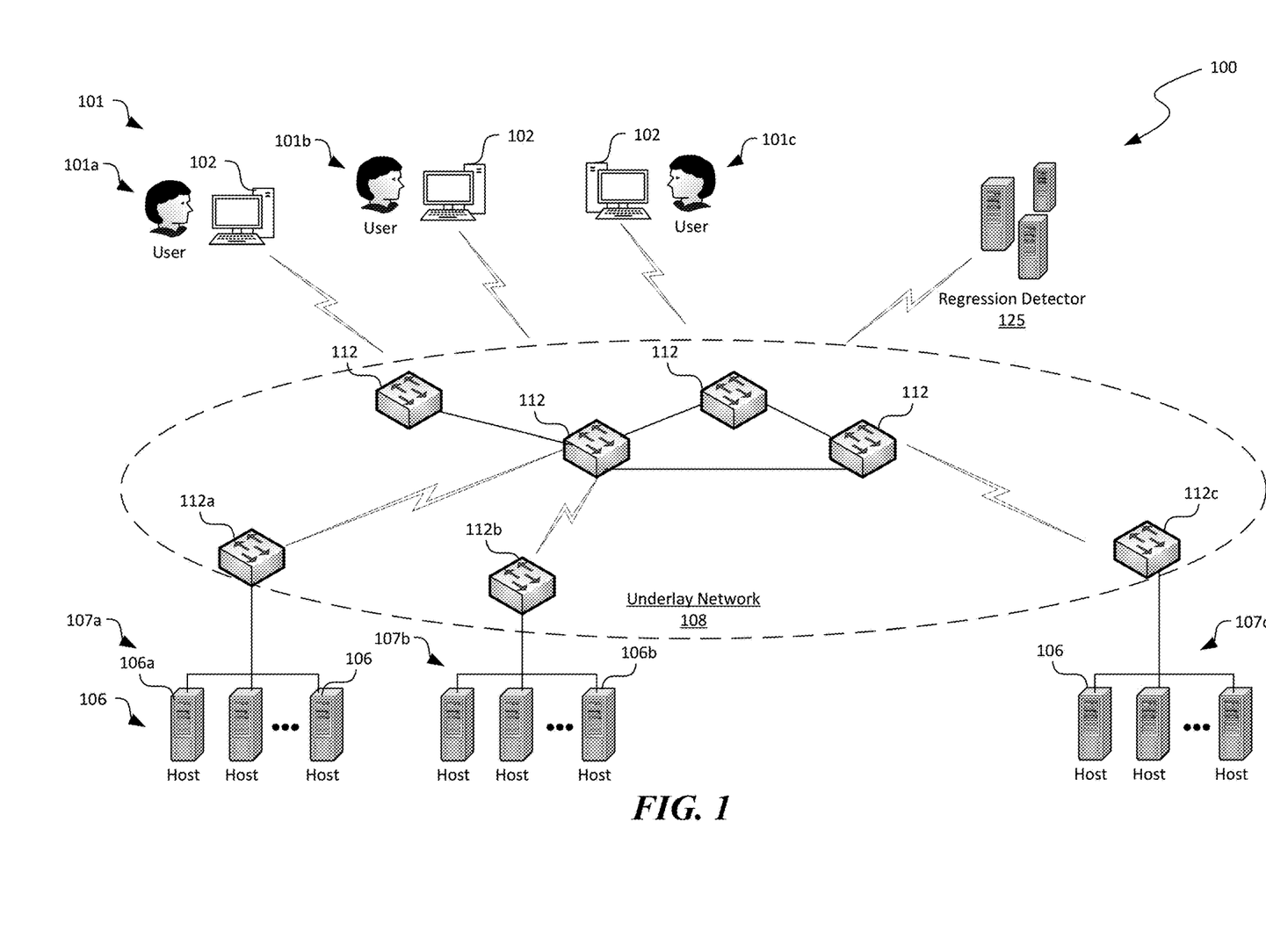
FIG. 1 is a schematic diagram illustrating a distributed computing system implementing application regression detection in accordance with embodiments of the disclosed technology.

FIG. 1 is a schematic diagram illustrating a distributed computing system 100 implementing proactive application regression detection in accordance with embodiments of the disclosed technology. As shown in FIG. 1, the distributed computing system 100 can include an underlay network 108 interconnecting a plurality of hosts 106, a plurality of client devices 102 associated with corresponding users 101, and a regression detector 125 operatively coupled to one another. Even though particular components of the distributed computing system 100 are shown in FIG. 1, in other embodiments, the distributed computing system 100 can also include additional and/or different components or arrangements. For example, in certain embodiments, the distributed computing system 100 can also include network storage devices, additional hosts, and/or other suitable components (not shown).

As shown in FIG. 1, the underlay network 108 can include one or more network nodes 112 that interconnect the multiple hosts 106 and the users 101. In certain embodiments, the hosts 106 can be organized into racks, action zones, groups, sets, or other suitable divisions. For example, in the illustrated embodiment, the hosts 106 are grouped into three host sets identified individually as first, second, and third host sets 107a-107c. In the illustrated embodiment, each of the host sets 107a-107c is operatively coupled to a corresponding network nodes 112a-112c, respectively, which are commonly referred to as "top-of-rack" or "TOR" network nodes. The TOR network nodes 112a-112c can then be operatively coupled to additional network nodes 112 to form a computer network in a hierarchical, flat, mesh, or other suitable types of topology. The underlay network can allow communication between hosts 106, the regression detector 125, and the users 101. In other embodiments, the multiple host sets 107a-107c may share a single network node 112 or can have other suitable arrangements.

The hosts 106 can individually be configured to execute user applications 147 (shown in FIG. 2) to provide computing, storage, and/or other cloud or other suitable types of computing services to the users 101. For example, as described in more detail below with reference to FIG. 2, one of the hosts 106 can initiate and maintain one or more virtual machines 144 (shown in FIG. 2) upon requests from the users 101. The users 101 can then utilize the initiated virtual machines 144 to execute user applications 147 to perform computation, communication, and/or other suitable tasks. In certain embodiments, one of the hosts 106 can provide virtual machines 144 for multiple users 101. For example, the host 106a can host three virtual machines 144 individually corresponding to each of the users 101a-101c. In other embodiments, multiple hosts 106 can host virtual machines 144 for the users 101a-101c.

The client devices 102 can each include a computing device that facilitates corresponding users 101 to access cloud services provided by the hosts 106 via the underlay network 108. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the distributed computing system 100 can facilitate any suitable number of users 101 to access cloud or other suitable types of computing services provided by the hosts 106.

The regression detector 125 can be configured to perform application regression analysis on telemetry records received from the user applications 147, the virtual machines 144, and/or the hosts 106. In certain embodiments, the regression detector 125 can be configured to derive an error percentage or failure rate related to a failed operation based on a number of occurrences in which the operation has failed over a total number of occurrences in which the operation is executed by the user application 147. As such, the derived error percentage can compensate for a workload of the user application 147. For example, even when the workload increases due to high demand from the users 101, the derived error percentage should remain relatively constant if the user application 147 does not contain programming and/or configuration errors. In contrast, the total number of exception records tend to increase because of the increased volume of attempts to execute the operation. In the embodiment illustrated in FIG. 1, the regression detector 125 is shown as a standalone computing device. In other embodiments, the regression detector 125 can be integrated into a datacenter controller, a fabric controller, or other suitable types of controller. In further embodiments, one or more components of the regression detector 125 can be implemented as a computing service on one or more of the hosts 106. Example component suitable for the regression detector 125 are described in more detail below with reference to FIG. 3.

Figure 2:
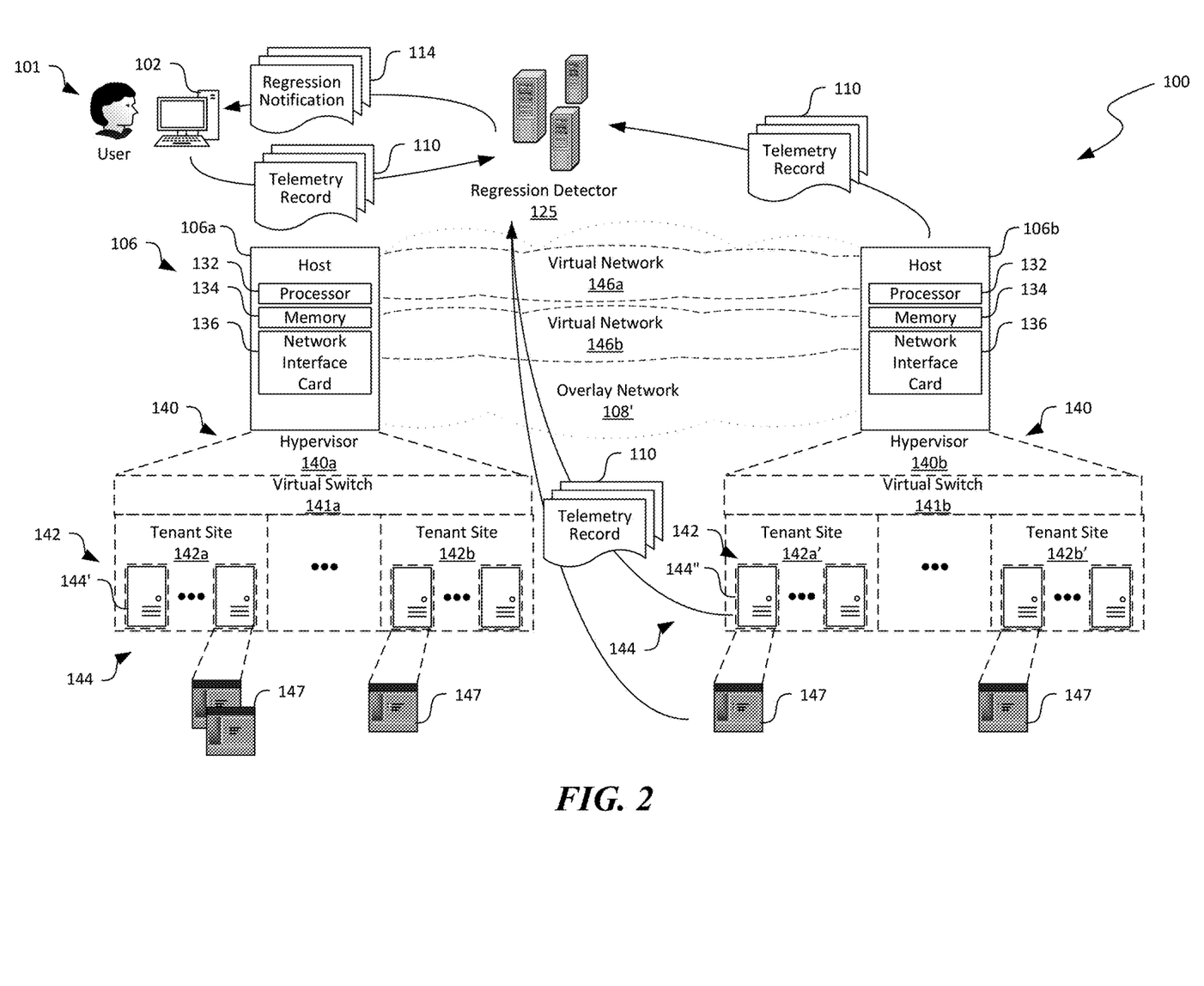
FIG. 2 is a schematic diagram illustrating certain hardware/software components of the distributed computing system of FIG. 1 in accordance with embodiments of the disclosed technology.

FIG. 2 is a schematic diagram illustrating certain hardware/software components of the distributed computing system 100 in accordance with embodiments of the disclosed technology. In particular, FIG. 2 illustrates an overlay network 108' that can be implemented on the underlay network 108 in FIG. 1. Though particular configuration of the overlay network 108' is shown in FIG. 2, In other embodiments, the overlay network 108' can also be configured in other suitable ways. In FIG. 2, only certain components of the underlay network 108 of FIG. 1 are shown for clarity.

In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the first host 106a and the second host 106b can each include a processor 132, a memory 134, and a network interface card 136 operatively coupled to one another. The processor 132 can include a microprocessor, a field-programmable gate array, and/or other suitable logic devices. The memory 134 can include volatile and/or non-volatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 4A and 4B). The network interface card 136 can include a network adapter, a LAN adapter, physical network interface, or other suitable types of hardware component that connects a host 106 to the underlay network 108 (FIG. 1). In other embodiments, the hosts 106 can also include input/output devices configured to accept input from and provide output to an operator and/or an automated software controller (not shown), or other suitable types of hardware components.

The first and second hosts 106a and 106b can individually contain instructions in the memory 134 executable by the processors 132 to cause the individual processors 132 to provide a hypervisor 140 (identified individually as first and second hypervisors 140a and 140b) and a virtual switch 141 (identified individually as first and second virtual switches 141a and 141b). Even though the hypervisor 140 and the virtual switch 141 are shown as separate components, in other embodiments, the virtual switch 141 can be a part of the hypervisor 140 (e.g., operating on top of an extensible switch of the hypervisors 140), an operating system (not shown) executing on the hosts 106, or a firmware component of the hosts 106.

The hypervisors 140 can individually be configured to generate, monitor, terminate, and/or otherwise manage one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively. The hypervisors 140 are individually shown in FIG. 2 as a software component. However, in other embodiments, the hypervisors 140 can be firmware and/or hardware components. The tenant sites 142 can each include multiple virtual machines 144 for a particular tenant (not shown). For example, the first host 106a and the second host 106b can both host the tenant site 142a and 142a' for a first user 101a (FIG. 1). The first host 106a and the second host 106b can both host the tenant site 142b and 142b' for a second tenant 101b (FIG. 1). Each virtual machine 144 can be executing a corresponding operating system, middleware, and/or applications.

Also shown in FIG. 2, the distributed computing system 100 can include an overlay network 108' having one or more virtual networks 146 that interconnect the tenant sites 142a and 142b across multiple hosts 106. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 can be configured to execute one or more user applications 147 to provide suitable cloud or other suitable types of computing services to the users 101 (FIG. 1). The user applications 147 and the virtual machines 144 on the virtual networks 146 can also communicate with one another via the underlay network 108 (FIG. 1) even though the virtual machines 144 are located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a particular virtual network 146. Thus, different virtual networks 146 can use one or more virtual network addresses that are the same. Example virtual network addresses can include IP addresses, MAC addresses, and/or other suitable addresses.

As shown in FIG. 2, in certain embodiments, during execution of the user applications 147, the various user applications 147, the virtual machines 144, and/or the hosts 106 can generate and emit telemetry records 110 to the regression detector 125. In other embodiments, the client device 102 can also generate certain telemetry records. For example, a user application 147 can implement a website accessible to the user 101 via the client device 102 and the overlay/underlay network 108 and 108'. In such implementations, a web browser executing on the client device 102 can generate and emit certain telemetry records 110 directly from the client device 102. Examples of such telemetry records 110 include those indicating webpage load times, web browser timings, webpage load timeouts, etc. At least some of the telemetry records 110 can be exception records indicating a failed operation. The regression detector 125 can then analyze the received telemetry records 110 and determine an error percentage or failure rate of an operation based on the received telemetry records 110.

In one embodiment, the regression detector 125 can utilize a score function (e.g., a rule-based function) configured to calculate an error percentage or a failure rate by dividing a number of sessions (or occurrences) for an operation having exception records by a total number of sessions in which the operation has been executed within a timespan. For example, the operation can be to perform a HTTP load of a webpage identified by a URL. Using the score function, the regression detector 125 can then calculate an error percentage by dividing a number of sessions having request exceptions when performing the HTTP load over a total number of sessions in which the HTTP load is attempted.

In another embodiment, when multiple sessions can be identified for a single operation, the regression detector 125 can utilize the score function to calculate the error percentage by dividing a number of sessions having exception records divided by a total number of sessions in the timespan. For instance, the single operation may include a worker process that is created periodically for performing background processing such as virus scanning, document indexing, or other suitable maintenance operations. In a further embodiment, when no session identifications are known, the regression detector 125 can utilize the score function to calculate an error percentage by dividing a number of exception records by a total number of all other telemetry records in a timespan. Such an implementation may be applied to a continuously running worker component for performing background processing.

In further embodiments, the exception records can also be normalized by using other load-related indicators. For example, the regression detector 125 can normalize the exception records based on processor load, network throughput, volume of user requests, or other suitable load-related indicators. In yet further embodiments, machine learning may be applied to determine a baseline for the exception records and/or error percentages.

The regression detector 125 can then determine whether application regression has occurred for the user applications 147 based on the derived error percentages. For example, the regression detector 125 can determine whether one or more derived error percentages are above a threshold. The threshold can be determined by averaging all or part of the derived error percentages, analyzing historical error percentages, or by applying other suitable techniques. In other examples, the regression detector 125 can also identifying patterns (e.g., peaks, rates of increase, sustained increases, etc.) in the error percentages as a function of time. Based on the identified patterns, the regression detector 125 can indicate whether the user application 147 has experienced application regression.

In response to determining that application regression has been detected for the user application 147, the regression detector 125 can transmit a regression notification 114 to the user 101. The user 101 or other suitable entities can then debug, modify configuration, or perform other suitable remedial actions for the user application 147 to ameliorate or reverse the application regression. Example components and associated operations of the regression detector 125 are described in more detail below with reference to FIG. 3.

Figure 3:
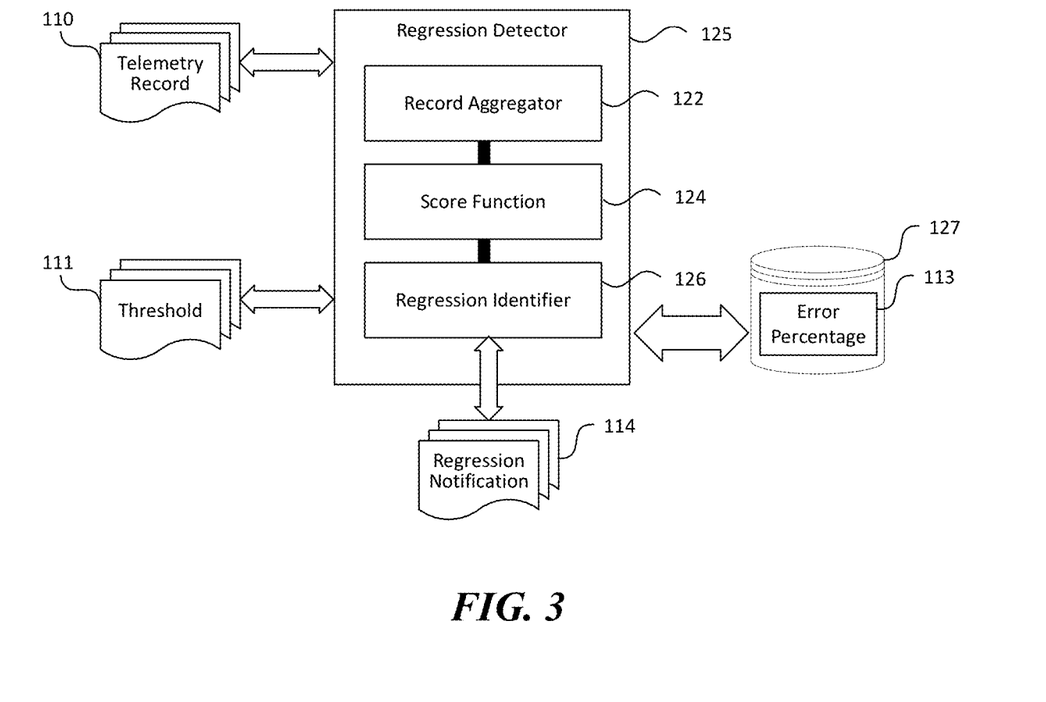
FIG. 3 is a schematic diagram illustrating certain hardware/software components of the regression detector of FIG. 1 in accordance with embodiments of the disclosed technology.

FIG. 3 is a schematic diagram illustrating certain hardware/software components of the regression detector of FIG. 1 in accordance with embodiments of the disclosed technology. As shown in FIG. 3, the regression detector 125 can include a record aggregator 122, a score function 124, and a regression identifier 126 operatively coupled to one another. Even though particular components of the regression detector 125 are shown in FIG. 3, in other embodiments, the regression detector 125 can also include input/output, communications, and/or other suitable types of components.

The record aggregator 122 can be configured to aggregate the received telemetry records 110 or exception records for multiple time intervals within a timespan. For example, the received telemetry records 110 within a week (i.e., timespan) can be aggregated by each day (i.e., time intervals) in the week. In another example, the received telemetry records 110 can be aggregated by each minute, hour, day, or week within a month, year, or other suitable timespans. In certain embodiments, a user 101 (FIG. 1) can define the time intervals and/or the timespan. In other embodiments, an administrator (not shown) or other suitable entities can define the time intervals and/or the timespan.

The score function 124 can then calculate an error percentage for the aggregated telemetry records 110 in each of the time intervals. In one embodiment, the score function 124 can be configured to determine whether the received telemetry records are related to more than one operation. In response to determining that the received telemetry records are related to multiple operations, the score function 124 can be configured to derive a distinct error percentage for each of the multiple operations. For example, the score function can derive the error percentage by dividing a number of sessions in which the each of the operations has failed, as indicated by the corresponding telemetry records, by a total number of sessions in which the each of the operations is executed.

In response to determining that the received telemetry records are related to a single operation, the score function 124 can be configured to determine whether the received telemetry records are related to multiple sessions in which the single operation is executed. For example, the score function 124 can identify multiple sessions from the received telemetry records 110 based on, for instance, session identification numbers or other suitable indicator.

In response to determining that the received telemetry records are related to multiple sessions in which the single operation is executed, the score function 124 can be configured to derive an error percentage related to the single operation by dividing a number of sessions in which the single operation has failed, as indicated by the received telemetry records 110, by a total number of sessions in which the single operation is executed.

On the other hand, in response to determining that the received telemetry records 110 are not related to multiple sessions in which the single operation is executed, the score function 124 can be configured to derive an error percentage related to the single operation by dividing a number of the received telemetry records 110 that are exception records by a total number of the received telemetry records 110. The score function 124 can the provide the derived error percentages to the regression identifier 126 for further analysis and/or store the derived error percentages 113 in a database 127. Example operations of the score function 124 are described in more detail below with reference to FIGS. 5 and 6.

The regression identifier 126 can be configured to determine whether application regression is detected for a user application 147 (FIG. 2) by recognizing a pattern in the derived error percentages. For example, in one embodiment, the regression identifier 126 can identify a peak, a plateau, a gradual increase, or other patterns in the derived error percentages and associate such patterns with application regression. In other embodiments, the regression identifier 126 can also be configured to compare the derived error percentages with a threshold 111. Example threshold 111 can include an average of all or part of the derived error percentages 113, historical values of the error percentages 113 retrieved from the database 127, or predetermined via other suitable techniques. In response to detecting application regression, the regression identifier 126 can generate and transmit a regression notification 114 to a user 101 (FIG. 1) for taking remedial actions.

Figure 4:
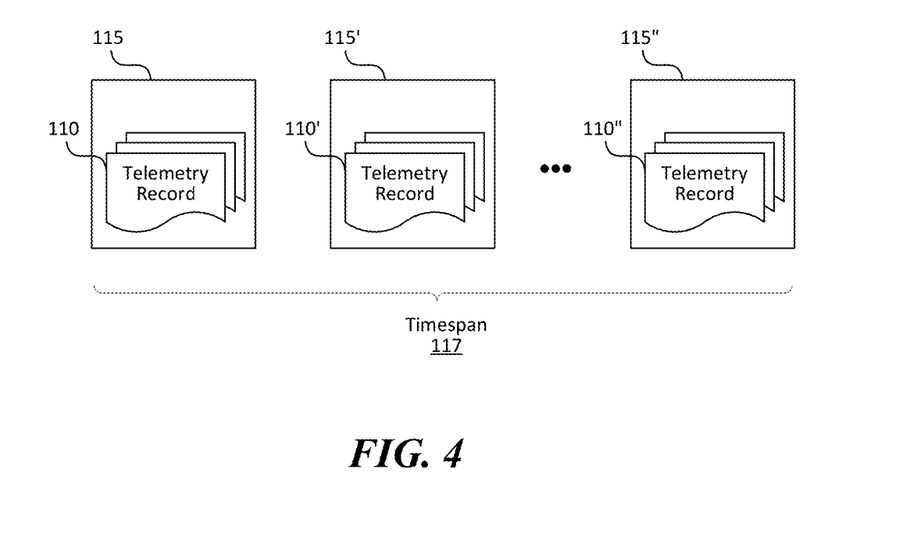
FIG. 4 is a schematic diagram illustrating example organization of telemetry records in accordance with embodiments of the disclosed technology.

FIG. 4 is a schematic diagram illustrating example organization of telemetry records in accordance with embodiments of the disclosed technology. As shown in FIG. 4, the telemetry records 110 can be binned into individual time intervals 115, 115', and 115" within a timespan 117. In certain embodiments, the telemetry records 110 can be binned based on a timestamp of generation of the telemetry records 110. In other embodiments, the telemetry records 110 can be binned based on a timestamp of reception of the telemetry records 110 or based on other suitable criteria.

Figure 5:
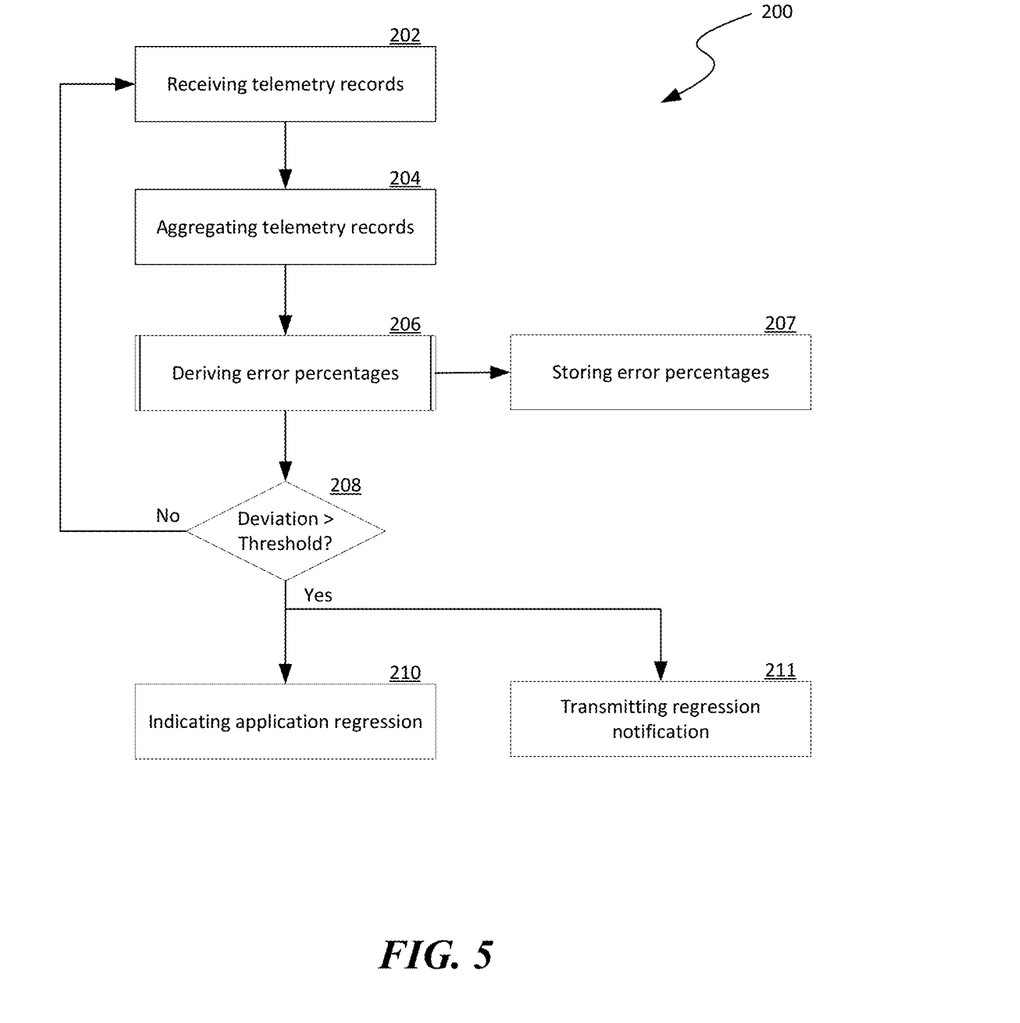
FIG. 5 is flowchart illustrating a process of detecting application regression in accordance with embodiments of the disclosed technology.

FIG. 5 is flowchart illustrating a process 200 of detecting application regression in accordance with embodiments of the disclosed technology. Though embodiments of the process 200 are described below with reference to the distributed computing system 100 of FIG. 1, in other embodiments, the process 200 can also be implemented in mobile computing systems, desktop computing systems, or other suitable computing systems.

As shown in FIG. 5, the process 200 can include receiving telemetry records at stage 202. In certain embodiments, the telemetry records can be received periodically from the user applications 147, virtual machines 144, and/or the hosts 106 via polling. In other embodiments, one or more reporting agents associated with the user applications 147, virtual machines 144, and/or the hosts 106 can periodically report the telemetry records. In further embodiments, the telemetry records can be received based on events (e.g., detection of a failed operation) or other suitable criteria.

The process 200 can then include aggregating the received telemetry records at stage 204. The telemetry records can be aggregated into multiple time intervals in a timespan, as described above with reference to FIGS. 3 and 4. The process 200 can then include deriving one or more error percentages based on the aggregated telemetry records at stage 206. Example operations of deriving the error percentages are described below with reference to FIG. 6. The process 200 can then include storing the error percentages in, for example, the database 127 in FIG. 3 at stage 207.

The process 200 can also include a decision stage 208 to determine whether one or more of the derived error percentages deviate from certain error percentage levels. In one embodiment, the derived error percentages can be compared to a preset threshold and determine whether one or more of the error percentages is above the threshold. In other embodiments, the derived error percentages can be compared to historical error percentage values (e.g., historical average, mean, medium, etc.) to determine whether a prescribed pattern (e.g., a peak or a gradual increase) exists in the derived error percentages. In further embodiments, the derived error percentages can be compared to an average, mean, or medium error percentage of all or a portion of the derived error percentage values, or with other suitable values. In response to determining that one or more of the derived error percentages is above the threshold, the process 200 can include indicating that an application regression has been detected at stage 210 and transmitting a regression notification at stage 211.

Figure 6:
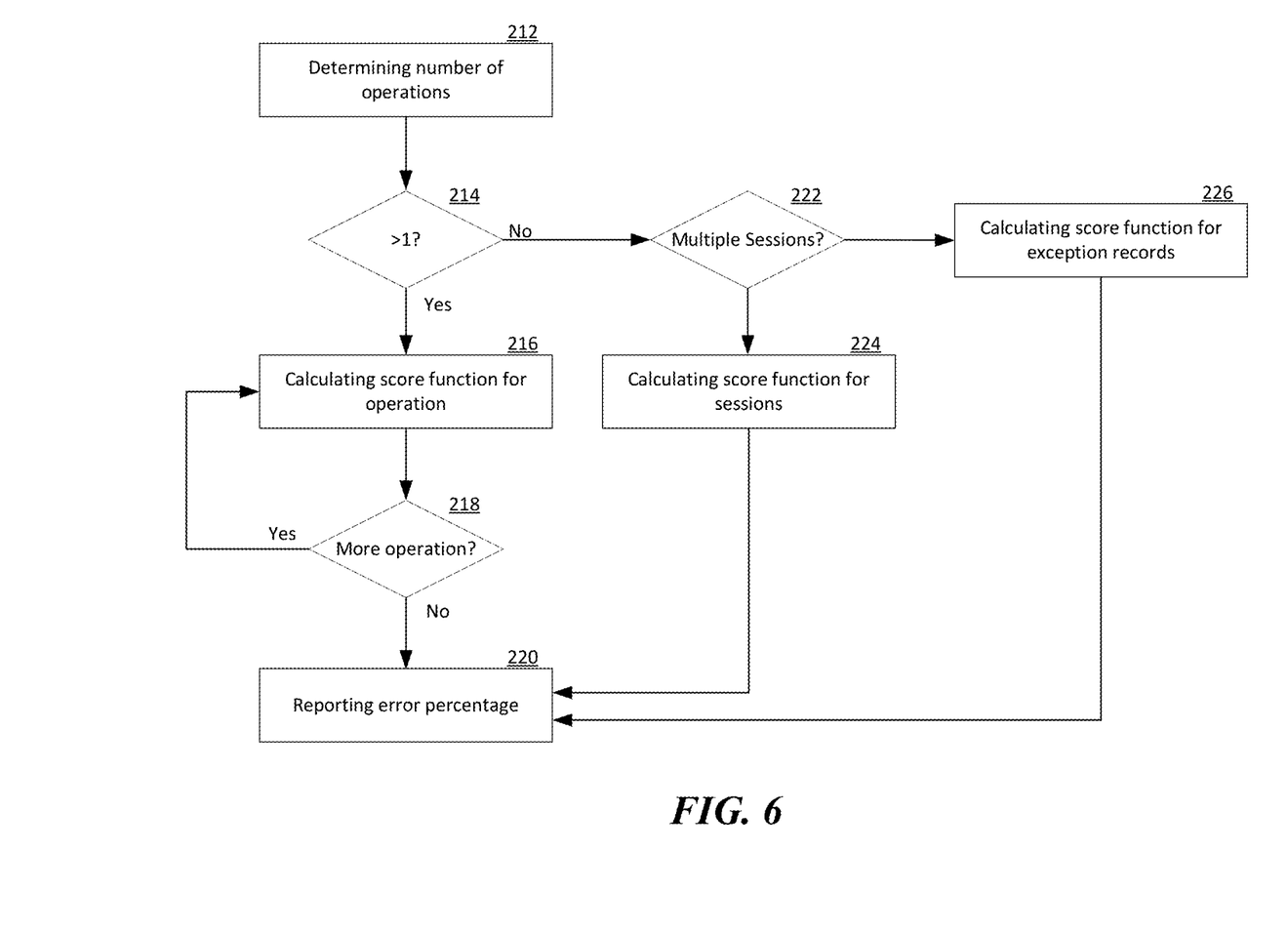
FIG. 6 is a flowchart illustrating example operations of deriving error percentages in accordance with embodiments of the disclosed technology.

FIG. 6 is a flowchart illustrating example procedures of deriving error percentages in accordance with embodiments of the disclosed technology. As shown in FIG. 6, the procedures can include determining a number of operations indicated in the received telemetry records at stage 212. The procedures can then include a decision stage 214 to determine whether the number of operations indicated in the received telemetry records is greater than one.

In response to determining that multiple operations are present, the procedures include calculating a score function for one of the operations at stage 216. For example, the score function can be calculated to derive an error percentage by dividing a number of sessions in which the each of the operations has failed by a total number of sessions in which the each of the operations is executed. The procedures can then include another decision stage 218 to determine whether additional operations are present. In response to determining that additional operations are present, the procedures revert to calculating another score function for one of the additional operations at stage 216; otherwise, the procedures proceed to reporting error percentages at stage 220.

In response to determining that a single operation is present, the procedures can include another decision stage 222 to determine whether the single operations have been performed in multiple sessions. In response to determining that the single operations has been performed in multiple sessions, the procedures can proceed to calculating an error percentage related to the single operation by dividing a number of sessions in which the single operation has failed by a total number of sessions in which the single operation is executed at stage 224. In response to determining that the single operations has been performed in a single session, the procedures proceed to calculating another score function to derive an error percentage related to the single operation by dividing a number of the received exception records by a total number of the received telemetry records at stage 226. The procedures can the proceed to reporting the calculated error percentages at stage 220.

Figure 7:
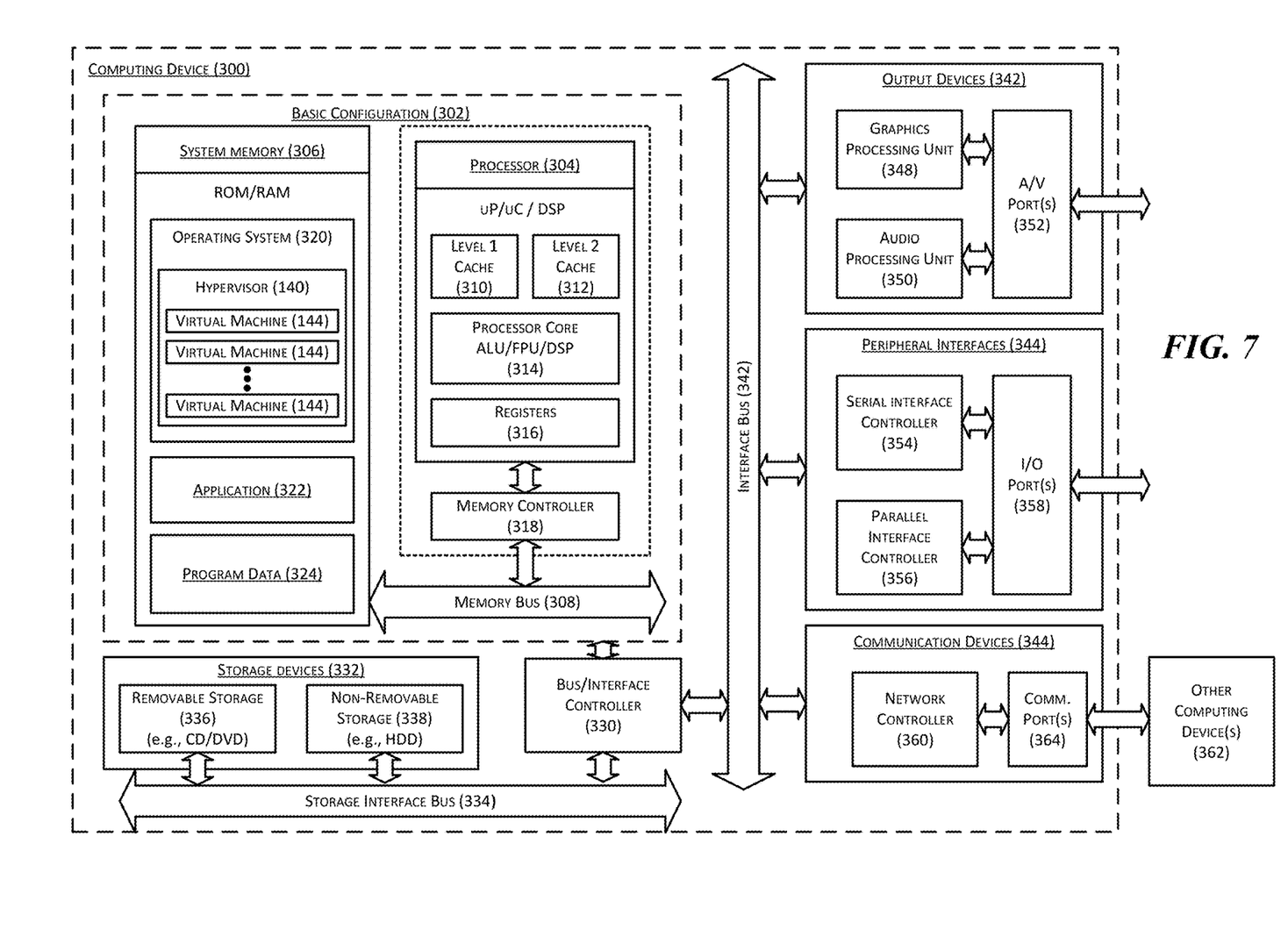
FIG. 7 is a computing device suitable for certain components of the distributed computing system in FIG. 1.

FIG. 7 is a computing device 300 suitable for certain components of the distributed computing system 100 in FIG. 1. For example, the computing device 300 can be suitable for the hosts 106, the client devices 102, or the regression detector 125 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (pP), a microcontroller (pC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 7, the operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more NV ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

I claim:

1. A method for detecting application regression in a distributed computing system having multiple hosts interconnected by a computer network, an individual host of the multiple hosts executing a user application to provide a cloud service to tenants, the method comprising:
   receiving, via the computer network, data representing telemetry records from the user application executing via the individual host, wherein at least one telemetry record of the telemetry records is an exception record indicating that an operation by the user application has failed during execution;
   deriving an exception rate of the operation based on the data representing the telemetry records;
   compensating the exception rate using a total number of occurrences in which the operation is executed by the user application;
   determining that application regression has occurred in the user application based on the compensated exception rate; and
   in response to determining that the application regression has occurred in the user application, generating, in the computer network, a regression notification indicating that the application regression has occurred in the user application.

2. The method of claim 1, further comprising aggregating the data representing the telemetry records for each of multiple time intervals within a predefined timespan, wherein deriving the exception rate includes deriving an error percentage for each of the multiple time intervals within the predefined timespan using the aggregated data representing the telemetry records for each of the multiple time intervals.

3. The method of claim 2, wherein the application regression is determined to have occurred in the user application based on at least one of the error percentages being above an error percentage threshold.

4. The method of claim 3, wherein the error percentage threshold is an average value of the error percentages derived for the multiple time intervals.

5. The method of claim 3, wherein the error percentage threshold is based on historical error percentages derived for the multiple time intervals.

6. The method of claim 1, wherein compensating the exception rate includes:
   determining that the data representing the telemetry records is related to multiple operations; and
   in response to determining that the data representing the telemetry records is related to the multiple operations, deriving a distinct exception rate related to each of the multiple operations by dividing a number of sessions in which each of the multiple operations has failed by a total number of sessions in which each of the multiple operations is executed.

7. The method of claim 1, wherein compensating the exception rate includes:
   determining that the data representing the telemetry records is related to a single operation; and
   in response to determining that the data representing the telemetry records is related to the single operation, determining that the data representing the telemetry records is related to multiple sessions in which the single operation is executed; and
   in response to determining that the data representing the telemetry records is related to the multiple sessions in which the single operation is executed, deriving an error percentage related to the single operation as the exception rate by dividing a number of sessions in which the single operation has failed by a total number of sessions in which the single operation is executed.

8. The method of claim 1, wherein compensating the exception rate includes:
   determining that the data representing the telemetry records is related to a single operation; and
   in response to determining that the data representing the telemetry records is related to the single operation, determining that the data representing the telemetry records is not related to multiple sessions in which the single operation is executed; and
   in response to determining that the data representing the telemetry records is not related to the multiple sessions in which the single operation is executed, deriving an error percentage related to the single operation as the exception rate by dividing a number of exception records by a total number of the telemetry records.

9. The method of claim 1, wherein:
   the exception record indicates the operation by the user application has failed during execution after a software update, a software patch, or a configuration change is applied to the user application; and
   the regression notification indicates that the software update, the software patch, or the configuration change has caused the application regression to occur in the user application.

10. The method of claim 1, further comprising sending the regression notification to an entity able to perform a remedial action to reverse the application regression.

11. A computing device in a distributed computing system having multiple hosts interconnected by a computer network, an individual host of the multiple hosts executing a user application to provide a cloud service to tenants, the computing device comprising:
    a processor; and
    a memory operatively coupled to the processor, the memory containing instructions executable by the processor to cause the computing device to:
       perform an analysis of telemetry records received via the computer network from the individual host, wherein at least one telemetry record of the telemetry records is an exception record indicating that an operation by the user application has failed during execution on the individual host;
       based on the analysis of the telemetry records, derive an exception rate of the operation based on the telemetry records;
       compensate the exception rate using a total number of occurrences in which the operation is executed by the user application;
       determine that application regression has occurred in the user application based on the compensated exception rate; and
       in response to determining that the application regression has occurred in the user application, generate, in the computer network, a regression notification indicating that the application regression has occurred in the user application.

12. The computing device of claim 11, wherein performing the analysis includes:
    determining that the telemetry records are related to multiple operations; and
    in response to determining that the telemetry records are related to the multiple operations, deriving a distinct error percentage related to each of the multiple operations by dividing a number of sessions in which each of the multiple operations has failed by a total number of sessions in which each of the multiple operations is executed.

13. The computing device of claim 11, wherein performing the analysis includes:
    determining that the telemetry records are related to a single operation; and
    in response to determining that the telemetry records are related to the single operation, determining that the exception record is related to multiple sessions in which the single operation is executed; and
    in response to determining that the exception record is related to the multiple sessions in which the single operation is executed, deriving an error percentage related to the single operation by dividing a number of sessions in which the single operation has failed by a total number of sessions in which the single operation is executed.

14. The computing device of claim 11, wherein the regression notification indicates that a software update, a software patch, or a configuration change has caused the application regression of the user application.

15. The computing device of claim 11, wherein the instructions are further executable by the processor to cause the computing device to send the regression notification to an entity able to perform a remedial action to reverse the application regression.

16. A method for detecting application regression in a distributed computing system having multiple hosts interconnected by a computer network, an individual host of the multiple hosts executing a user application to provide a cloud service to tenants, the method comprising:
    receiving, via the computer network, data representing telemetry records from the individual host, at least one telemetry record of the telemetry records is an exception record indicating that an operation by the user application has failed during execution;

determining a failure rate of executing the operation by the user application in the distributed computing system based on the data representing the telemetry records;

compensating the failure rate based on a workload of the user application;

performing a comparison of the failure rate with a threshold; and based on the comparison of the failure rate with the threshold, generating, in the computer network, a regression notification indicating that application regression has occurred in the user application.

17. The method of claim 16, further comprising aggregating the data representing the telemetry records for each of multiple time intervals within a timespan, wherein determining the failure rate includes deriving a failure rate for each of the multiple time intervals within the timespan using the aggregated telemetry records for each of the multiple time intervals.

18. The method of claim 17, wherein performing the comparison includes determining whether at least one of the derived failure rates is above the threshold.

19. The method of claim 16, wherein performing the analysis includes:

determining that the telemetry records are related to multiple operations; and in response to determining that the telemetry records are related to the multiple operations, deriving a distinct failure rate related to each of the multiple operations by dividing a number of sessions in which each of the multiple operations has failed by a total number of sessions in which each of the multiple operations is executed.

20. The method of claim 16, further comprising sending the regression notification to an entity able to perform a remedial action to reverse the application regression.

* * * * *